(12) United States Patent
Schwarz et al.

(10) Patent No.: US 12,276,329 B2
(45) Date of Patent: Apr. 15, 2025

(54) SUPPORT STRUCTURE FOR A GEAR WHEEL OF A GEARED MOTOR OF AN ELECTRICALLY OPERABLE BRAKE, GEAR ASSEMBLY, GEARED MOTOR, PARKING BRAKE SYSTEM, AND SERVICE BRAKE SYSTEM

(71) Applicant: ZF Active Safety GmbH, Koblenz (DE)

(72) Inventors: Daniel Schwarz, Koblenz (DE); Timo Frieb-Preis, Münstermaifeld (DE)

(73) Assignee: ZF Active Safety GmbH, Koblenz (DE)

( * ) Notice: Subject to any disclaimer, the term of this patent is extended or adjusted under 35 U.S.C. 154(b) by 502 days.

(21) Appl. No.: 16/957,102

(22) PCT Filed: Dec. 18, 2018

(86) PCT No.: PCT/EP2018/085401
§ 371 (c)(1),
(2) Date: Jun. 22, 2020

(87) PCT Pub. No.: WO2019/121621
PCT Pub. Date: Jun. 27, 2019

(65) Prior Publication Data
US 2021/0362700 A1    Nov. 25, 2021

(30) Foreign Application Priority Data

Dec. 22, 2017  (DE) .......................... 102017131120.3

(51) Int. Cl.
*F16H 57/021*  (2012.01)
*F16H 55/17*  (2006.01)
(Continued)

(52) U.S. Cl.
CPC ........... *F16H 57/021* (2013.01); *F16H 55/17* (2013.01); *B60T 13/741* (2013.01);
(Continued)

(58) Field of Classification Search
CPC ......... B60T 13/74–743; F16D 2125/48; F16D 2125/50; F16D 2125/52; F16D 2121/24;
(Continued)

(56) References Cited

U.S. PATENT DOCUMENTS 6,256,570 B1    7/2001  Weiberle et al.
7,325,658 B2 *  2/2008  Halasy-Wimmer .... H02K 7/116
                                                188/162
(Continued)

FOREIGN PATENT DOCUMENTS

DE    102004048700 A1    5/2006
JP       2016130558 A    7/2016
(Continued)

*Primary Examiner* — Erin D Bishop
(74) *Attorney, Agent, or Firm* — Robert James Harwood

(57) ABSTRACT

The support structure comprises a main body, a base part, and a ring gear having internal teething. The main body has at least one axle element for rotatably mounting the at least one gear wheel, or at least one connection point for an axle element for rotatably mounting the one gear wheel. The ring gear is mounted with an axial end on the base part and is designed to be used as an outer gear wheel of a planetary gear drive. The internal teething of the ring gear has a plurality of tooth elements which extend in each case from a tooth foot to a tooth head in the radial direction relative to a centre axis of the ring gear. An intermediate space, exposing a region of the tooth head at least of individual tooth elements or a number thereof, is provided between the internal teething and the base part.

12 Claims, 3 Drawing Sheets

(51) Int. Cl.
  *B60T 13/74* (2006.01)
  *F16H 57/02* (2012.01)
(52) U.S. Cl.
  CPC .................. *F16H 2055/176* (2013.01); *F16H 2057/02034* (2013.01); *F16H 2057/0216* (2013.01)
(58) Field of Classification Search
  CPC ... F16H 2057/0216; F16H 2057/02034; F16H 57/021; F16H 2055/176
  See application file for complete search history.

(56) References Cited

U.S. PATENT DOCUMENTS

| 9,340,194 B2 | 5/2016 | Giering |
| 2013/0180811 A1 | 7/2013 | Poertzgen et al. |
| 2015/0233434 A1 | 8/2015 | Hayashi et al. |
| 2018/0202517 A1* | 7/2018 | Jang ........................ F16D 65/18 |

FOREIGN PATENT DOCUMENTS

| KR | 1020110026115 A | 3/2011 |
| WO | 2012010256 A1 | 1/2012 |
| WO | 2015151052 A1 | 10/2015 |

* cited by examiner

SUPPORT STRUCTURE FOR A GEAR WHEEL OF A GEARED MOTOR OF AN ELECTRICALLY OPERABLE BRAKE, GEAR ASSEMBLY, GEARED MOTOR, PARKING BRAKE SYSTEM, AND SERVICE BRAKE SYSTEM

CROSS-REFERENCE TO RELATED APPLICATION

This application is a national stage of International Application No. PCT/EP2018/085401, filed Dec. 18, 2018, the disclosure of which is incorporated herein by reference in its entirety, and which claimed priority to German Patent Application No. 102017131120.3, filed Dec. 22, 2017, the disclosure of which is incorporated herein by reference in its entirety.

TECHNICAL FIELD

The present disclosure concerns a support structure for at least one gear wheel of a geared motor of an electrically operable brake. The present disclosure furthermore concerns a gear assembly for a geared motor of an electrically operable brake, a geared motor for an electrically operable brake, a parking brake system for a motor vehicle, and a service brake system for a motor vehicle.

BACKGROUND

A support structure of the type concerned here is disclosed in WO 2012/010256 A1. The support structure there is part of a gear assembly which, together with an electric motor, forms a geared motor unit for operating an electrically operable brake of a motor vehicle. The support structure has a main body with at least one connection point for attaching an axle element for rotatably mounting a gear wheel of the gear assembly. The support structure has an assigned ring gear with inner toothing which forms an outer gear wheel of a planet gear stage of the gear assembly. The ring gear is attached rotationally fixedly to the support structure in that an axial end thereof is molded to the support structure.

When high forces must be absorbed, such a support structure has been found to promote the occurrence of local load peaks, for example in regions of transition from an axial end of the ring gear to the support structure. This frequently affects the regions of transition from the toothing to the support structure, since here, due to the geometry of the toothing, there is a quasi-sudden change in component stiffness.

SUMMARY

It is an object of the present disclosure to refine a support structure of the type cited initially so as to counter any local load peaks in the support structure.

This object is achieved with a support structure which has the features of claim 1. Advantageous embodiments and/or designs and/or aspects of the present disclosure arise from the subclaims, the following description and the figures.

A basic support structure for at least one gear wheel of a geared motor of an electrically operable brake, such as for example a parking brake or service brake, comprises a main body, a base part, and a ring gear with inner toothing. The main body has at least one axle element for rotatably mounting the at least one gear wheel, or at least one connection point for an axle element for rotatably mounting the at least one gear wheel. The ring gear is mounted by an end face or axial end on the base part, and is designed to be used as an outer gear wheel of a planetary gear mechanism. The inner toothing of the ring gear has a plurality of tooth elements which each extend from a tooth foot to a tooth head in the radial direction relative to a central axis of the ring gear. For example, the tooth elements lie with their respective tooth head on a common head circle diameter and with their respective tooth foot on a common foot circle diameter.

The term "tooth head" means in particular the radially protruding end, i.e. the upper end of a tooth element of the toothing. The tooth head may be a tooth tip or comprise at least one tooth tip. The term "tooth foot" means in particular the lower end of a tooth element of the toothing. In particular, the tooth foot is assigned to the ring body of the ring gear. In particular, the respective tooth element is molded onto the ring gear via its tooth foot.

In the support structure, an intermediate space is provided between the inner toothing and the base part, and exposes a region of the tooth head of at least individual or some tooth elements. Thus for the tooth elements concerned, in the exposed region of the tooth head, the one axial end of the ring gear is arranged at a distance from the base part, wherein the distance is formed by the intermediate space. In this way, the inner toothing of the ring gear in the exposed region of the tooth head is structurally decoupled from the base part, so that the possible differences in component stiffness between the toothing and the base part in this region have no or only slight effect. To this extent, in this way any local load peaks are countered, if for example high forces act on or must be absorbed by the support structure, in particular the base part and/or the ring gear. This gives a more favorable support pattern for the support structure and promotes a longer service life of the support structure.

It has been shown that the region between the toothing and the base part which is exposed by the intermediate space should have a specific extent in the radial direction in order to significantly counter any local load peaks in the support structure. It has been found that the intermediate space should extend in the radial direction until it ends in the region of the tooth foot. For this, it may be provided that, starting from the tooth head and viewed in the radial direction relative to the central axis of the ring gear, the intermediate space ends before the tooth foot. In this case, the intermediate space extends in the radial direction until before the tooth foot. It may also be provided that, starting from the tooth head and viewed in the radial direction relative to the central axis of the ring gear, the intermediate space ends at or in the tooth foot. In this case, the intermediate space extends in the radial direction up to or into the tooth foot. In principle, it may also be provided that, starting from the tooth head and viewed in the radial direction relative to the central axis of the ring gear, the intermediate space ends after the tooth foot. The intermediate space then extends in the radial direction over the tooth foot.

It is suitable if the intermediate space is circumferential. Because of the also circumferential inner toothing, in this way the occurrence of any local load peaks is countered with respect to the entire inner toothing, in particular since decoupling of the connection between the inner toothing and the base part is achieved over the inner circumference of the ring gear. In principle, the circumferential intermediate space may also have at least one interruption or several interruptions which are for example distributed over the circumference of the inner toothing.

According to one embodiment, it is provided that the intermediate space is formed by a preferably slot-like depression. This promotes a compact construction of the support structure in the axial direction relative to the central axis of the ring gear, since the intermediate space is relatively small in the axial direction. The measure of forming the support structure, in particular the main body and/or the base part, as a platform is also aimed in this direction. The intermediate space can be produced in a technically simple fashion if, according to one embodiment, the intermediate space is formed by a material cutout, for example a notch.

The ring gear may be molded onto the base part. Furthermore, the base part may be molded onto the main body. For example, the support structure is made of one piece, i.e. formed integrally. The support structure may be a plastic part and consist of plastic or comprise plastic. For example, the support structure is an injection molding. In this case, the support structure is produced by means of an injection-molding process. The above-mentioned measures facilitate economic and/or technically simple production of the support structure.

According to a further design and/or embodiment, it is provided that the base part has a passage opening and, in the radial direction relative to the central axis of the ring gear, an edge portion of the passage opening or a portion of the rim of the passage opening protrudes inwardly over the inner toothing, in particular the tooth head of the tooth elements. For example, the passage opening is arranged with its central axis coaxial to the central axis of the ring gear. The passage opening creates a passage through the ring gear in the axial direction relative to its central axis, via which passage for example a planet carrier of a planetary gear mechanism or the above-mentioned planetary gear mechanism can be brought into the active position.

It may furthermore be provided that the base part has a circumferential depression which is configured for rotatably mounting a planet carrier of the planetary gear mechanism or the planet carrier. For example, the depression forms a receiver for the planet carrier which can be rotatably supported against the recessed surface of the base part in the axial direction relative to the central axis of the ring gear. The rim of the passage opening furthermore achieves a situational positioning, in particular a centering of the planet carrier if the outer dimensions of the planet carrier correspond or substantially correspond to the circumferential dimension of the passage opening According to a further aspect of the present disclosure, a gear assembly is provided for a geared motor of an electrically operable brake. The gear assembly can be actively connected on the input side to a drive machine and on the output side preferably to an operating element of the electrically operable brake, such as for example a threaded spindle or threaded nut of a lifting gear of the electrically actuated brake. It is in particular provided that the gear assembly comprises a planetary gear mechanism, at least one spur gear stage and the above-mentioned support structure, wherein the ring gear of the support structure forms an outer gear wheel of the planetary gear mechanism, and at least one axle element is provided on the main body of the support structure, on which element a gear wheel of the at least one spur gear stage is rotatably mounted.

According to yet a further aspect of the present disclosure, a geared motor is provided for an electrically operable brake. The geared motor comprises a drive machine and the above-mentioned gear assembly which is actively connected or connectable to the drive machine. For example, the drive machine is an electric motor. In principle, the geared motor is suitable for use in connection with a parking or holding brake and/or a service brake.

The present disclosure furthermore comprises a parking brake system for a motor vehicle. The parking brake system comprises the above-mentioned geared motor which serves to operate at least one brake shoe. The parking brake system furthermore comprises an electronic control unit for actuating the geared motor, wherein the control unit and the drive machine are configured to set, in particular steplessly, a parking brake force exerted by the at least one brake shoe, according to one or more predefined values, in order to execute a parking braking or holding braking. For example, the predefined values contain or are based on information on the slope of the road and/or the coefficient of friction of the road surface and/or the momentary driving or stationary state of the motor vehicle, or characteristic values of the motor vehicle such as for example the load state. In this way, a controlled setting of the parking brake force exerted by the at least one assigned brake shoe is possible, and brake force metering can be carried out, for example for comfortable start-up of the motor vehicle, in particular on a sloping road.

The term "parking braking" means in particular a function of the parking brake system by which a motor vehicle equipped with the parking brake system, in particular in the absence of the driver, is held stationary when a parking braking has been performed. The aim is to prevent the motor vehicle from rolling away undesirably even if the motor vehicle is standing on sloping road. The process of parking braking is also known as holding braking.

In addition, the present disclosure comprises a service brake system for a motor vehicle. The service brake system comprises the above-mentioned geared motor which serves to operate at least one brake shoe. The service brake system furthermore comprises an electronic control unit for actuating the geared motor, wherein the control unit and the drive machine are configured to set, in particular steplessly, a brake force exerted by the at least one brake shoe, according to one or more predefined values, in order to execute a service braking. For example, the predefined values contain or are based on information on the braking requested by the driver, a driver assistance system or an autonomous driving system, and/or the slope of the road and/or the coefficient of friction of the road surface and/or the momentary driving, deceleration or acceleration state of the motor vehicle, and/or characteristic values of the motor vehicle such as for example the load state. In this way, a controlled setting of the brake force exerted by the at least one assigned brake shoe is possible, and brake force metering can be carried out, for example for comfortable braking of the motor vehicle.

The term "service braking" means in particular a function of the service brake system which enables the driver, a driver assistance system or an autonomous driving system to reduce the speed of a motor vehicle equipped the service brake system during operation or bring the motor vehicle to a standstill.

Further details and features of the present disclosure arise from the following description of several exemplary embodiments with reference to the drawing.

DETAILED DESCRIPTION

Figure 1:
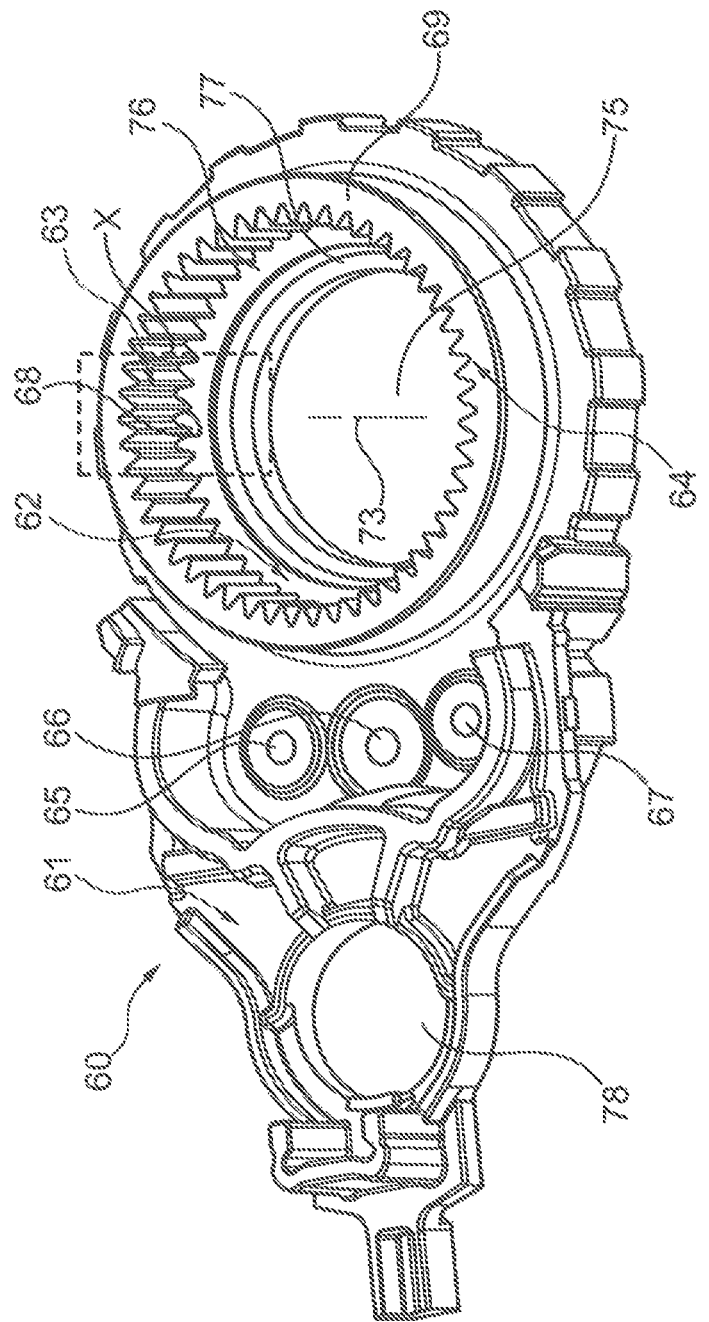
FIG. 1 in a perspective view, a possible embodiment of a support structure for a gear wheel of a geared motor, FIG. 2 in an enlarged depiction, a region of the ring gear of the support structure from FIG. 1 with inner toothing, FIG. 3 the region of the ring gear from FIG. 2 in a sectional depiction through the tooth head of a tooth element of the inner toothing, FIG. 4 the region of the ring gear from FIG. 2 in a sectional depiction through the tooth foot of the tooth element according to FIG. 3, and FIG. 5 in a sectional depiction, a possible embodiment of a geared motor, wherein the geared motor uses an embodiment of the support structure from FIG. 1.

FIG. 1 shows diagrammatically a possible embodiment of a support structure 60 which for example may be used as a carrier for one or more gear wheels (not shown in FIG. 1) of a geared motor. The support structure 60 comprises a main body 61, a base part 62 and a ring gear 64 having inner toothing 63. Preferably, the support structure 60 is configured as a platform. For example, for this the main body 61 and/or the base part 62 are formed as a platform.

The base body 61 comprises at least one and preferably several connection points 65, 66, 67, so that a respective axle element (not shown in FIG. 1) can be arranged thereon for rotatable mounting of the gear wheels. The main body 61 also comprises for example a passage opening 78 which is dimensioned so as to allow passage of a gear wheel (not shown in FIG. 1) which is connected rotationally fixedly to the output shaft of a drive machine (not shown in FIG. 1).

The ring gear 64 is configured to be used as an outer gear wheel of a planetary gear mechanism (not shown in FIG. 1). The ring gear 64 has mutually opposing end faces 68, 69 which preferably each form a plane running transversely to the central axis 73 of the ring gear 64. Preferably, one of the end faces 68, 69 of the ring gear 64 is arranged on the base part 62. For example, the one end face 68 of the ring gear 64 is molded onto the base part 62. Preferably, the base part 62 is molded onto the main body 61. For example, the support structure 60 is made of a single component. Preferably, the support structure 60 is a plastic part, in particular a plastic injection molding which consists of a plastic material or comprises a plastic material.

Preferably, the base part 62 has a passage opening 75. It is preferably provided that, in the radial direction relative to the central axis 73 of the ring gear 64, an edge portion 76 of the passage opening 75 protrudes inwardly over the inner toothing 63. For example, the passage opening 75 is arranged concentrically to the central axis 73 of the ring gear 64. Preferably, the base part 62 furthermore comprises a circumferential depression 77. Preferably, the depression 77 runs concentrically relative to the central axis 73 of the ring gear 64. For example, the circumferential depression 77 is formed in the radially inner end region of the edge portion 76 of the base part 72. For example, the circumferential depression 77 is configured for rotatably mounting a planet carrier (not shown in FIG. 1) of the planetary gear mechanism. The circumferential depression 77 may also be used as a receiver which receives and rotatably supports the planet carrier.

Figure 2:
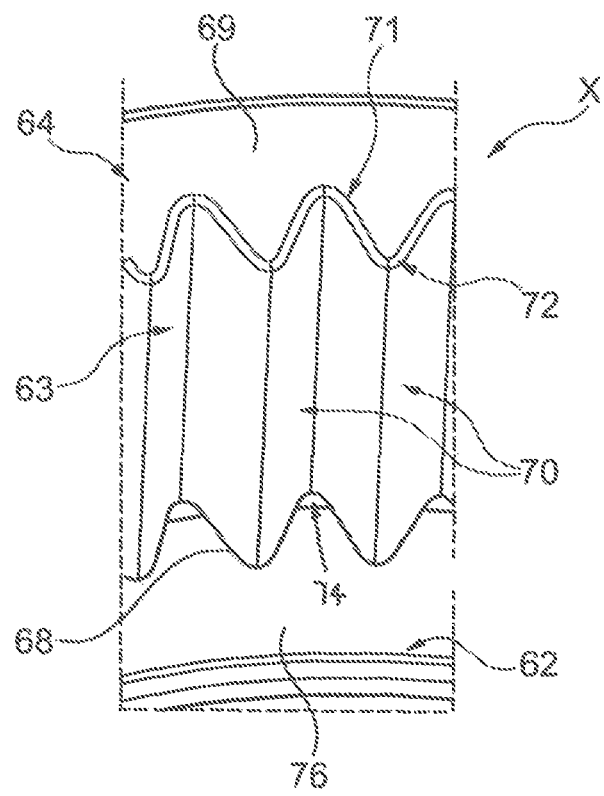

FIG. 2 shows an enlarged depiction of an extract marked "X" from the ring gear 64 in FIG. 1. As the figure shows in particular, the inner toothing 63 of the ring gear 64 has a plurality of tooth elements 70 which each extend from a tooth foot 71 to a tooth head 72 in the radial direction relative to the central axis 73 of the ring gear 64.

As FIG. 2 at least suggests, an intermediate space 74 is provided between the inner toothing 63 and the base part 62, and exposes a region of the tooth head 72 at least in the case of individual or some tooth elements 70. Thus in the one region, the intermediate space 74 distances the tooth head 72 from the base part 62 or the radially inwardly protruding edge portion 76 of the base part 62, in the axial direction relative to the central axis 73 of the ring gear 64. The intermediate space 74 counters any local stress peaks in the region of the inner toothing 63 when the support structure 60 is exposed to the effect of a force.

Figure 3:
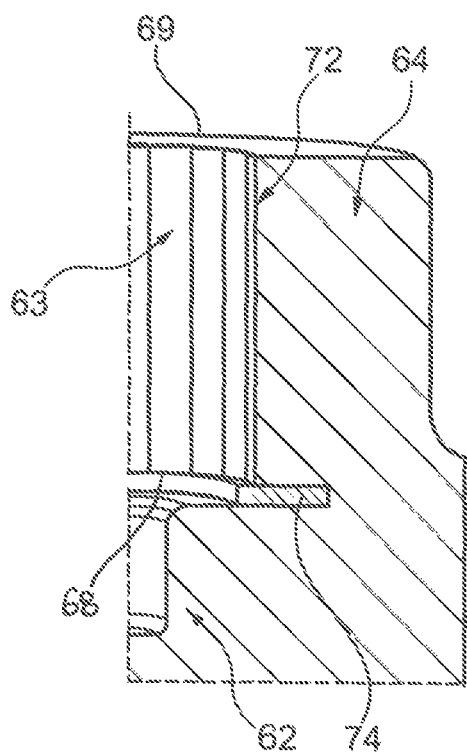
Figure 4:
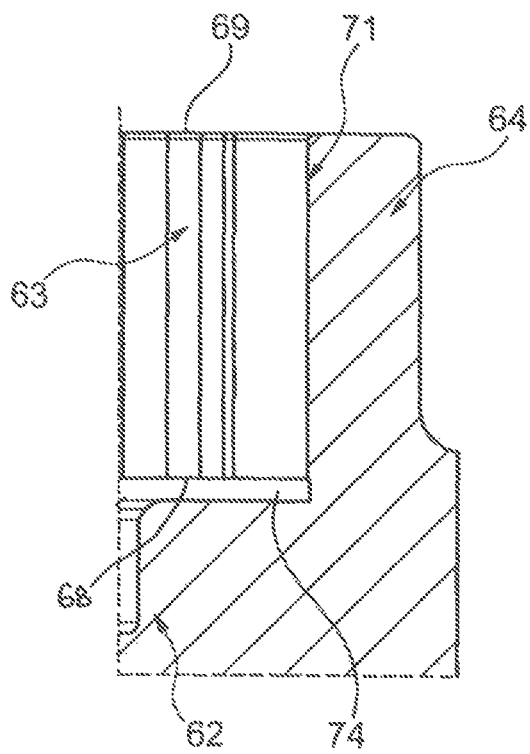

FIGS. 3 and 4 show the intermediate space 74 more clearly than FIG. 2. FIG. 3 shows the extract of the ring gear 64 from FIG. 2 in a sectional depiction, wherein the selected section plane runs through the tooth head 72 of one of the tooth elements 70. FIG. 4 shows the ring gear 64 from FIG. 2 in a sectional depiction in which the selected section plane runs through the tooth foot 71 of one of the tooth elements 70. FIGS. 3 and 4 show how the intermediate space 74 may be designed. Accordingly, the intermediate space 74 may be formed by a notch, in particular a slot-like notch, which for example ends in the region of the tooth foot 71. For example, it is provided that starting from the tooth head 72 and viewed in the radial direction relative to the central axis 73 of the ring gear 64, the intermediate space 74 ends at or in the tooth foot 71, as is particularly clear from FIG. 4.

Figure 5:
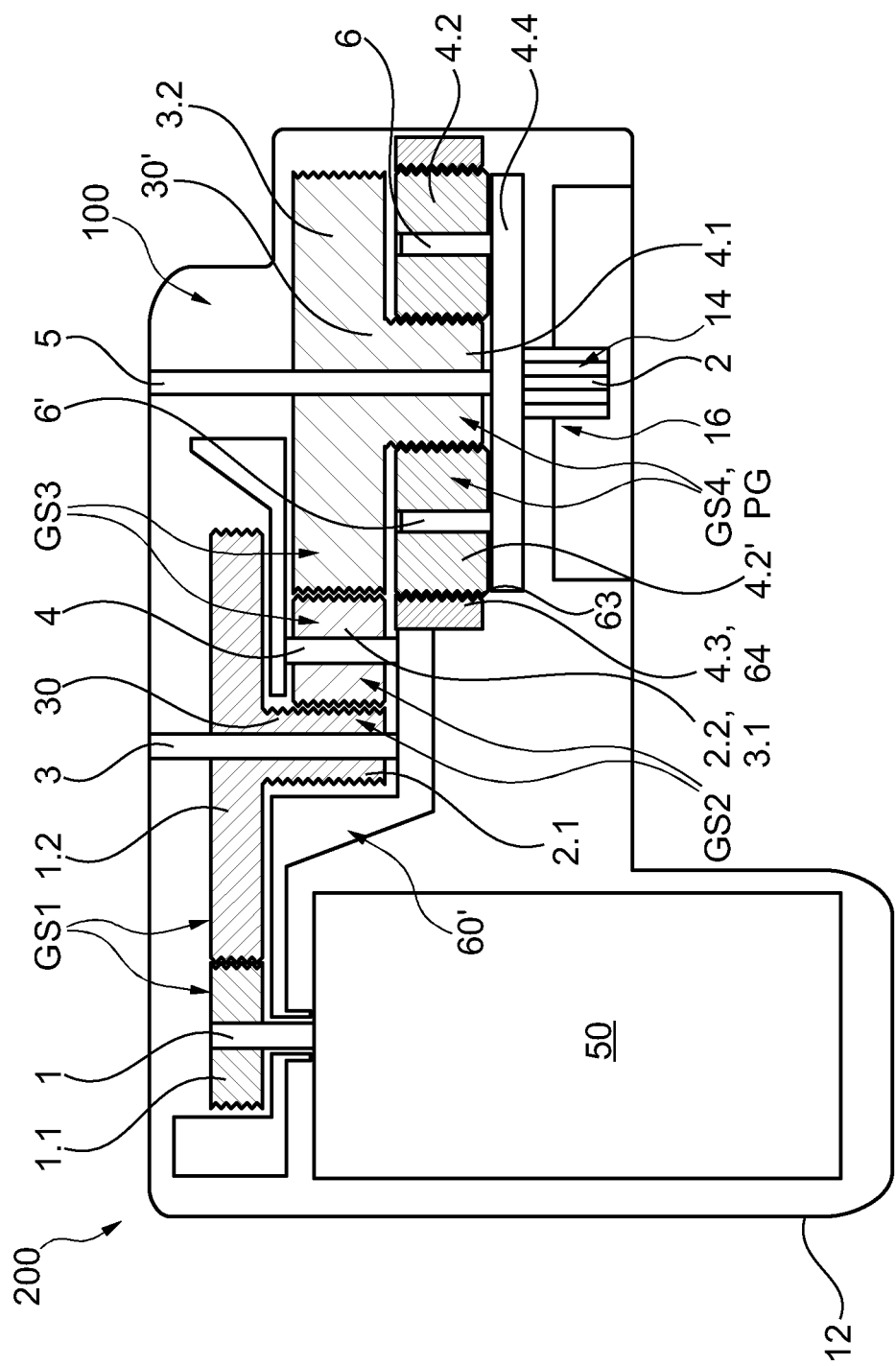

The support structure 60 from FIGS. 1 to 4, or an embodiment of a support structure 60' derived therefrom, may be used in a geared motor 200 as shown in FIG. 5. The geared motor 200 may for example be used to operate an electric parking or holding brake (EPB) and/or an electromechanical service brake (EMB) of a motor vehicle. The geared motor 200 comprises a drive machine 50 which is for example an electric motor. Furthermore, the geared motor 200 comprises a gear assembly 100. Preferably, the drive machine and the gear assembly 100 are arranged in a common housing 12.

The gear assembly 100 is actively connected on the input side to the drive machine 50. Preferably, for this the gear assembly 100 has a gear input shaft 1 which is coupled for drive purposes to the output shaft of the drive machine 50, in particular is connected rotationally fixedly thereto. Also, the gear input shaft 1 may be formed by the output shaft of the drive machine. The gear assembly 100 furthermore comprises a gear output shaft 2 which can be coupled to the parking or holding brake and/or service brake, for example to a lifting gear of the parking or holding brake and/or service brake. Preferably, for this the gear output shaft 2 is coupled for example at one end to a gear wheel 14 or another transmission element, in particular is rotationally fixedly connected thereto, or the gear wheel 14 or other transmission element is molded onto the gear output shaft 2. Preferably, the one end with the gear wheel 14 protrudes from the housing 12, and preferably a flange 16 is provided, in particular formed, on the housing 12 in the region around the gear wheel 14.

The gear assembly 100 furthermore comprises at least one and preferably several gear stages GS1, GS2, GS3, GS4, in particular a first gear stage GS1, a second gear stage GS2, a third gear stage GS3 and a fourth gear stage GS4. Preferably, viewed in the direction of the force flow starting from the drive machine 50, gear stages GS1, GS2, GS3, GS4 are arranged in the order of first gear stage GS1, second gear stage GS2, third gear stage GS3, fourth gear stage GS4. Preferably, the first gear stage GS1, the second gear stage GS2 and the third gear stage GS3 are each spur gears with at least two intermeshing gear wheels 1.1, 1.2 or 2.1, 2.2 or 3.1, 3.2, in particular a first gear wheel 1.1 and a second gear wheel 1.2 of the first gear stage GS1, a first gear wheel 2.1 and a second gear wheel 2.2 of the second gear stage GS2, and a first gear wheel 3.1 and a second gear wheel 3.2 of the third gear stage GS3.

Preferably, the fourth gear stage GS4 is a planetary gear mechanism PG with at least two gear wheels 4.1, 4.2, of which for example a first gear wheel 4.1 is a sun wheel, and a second gear wheel 4.2 is a planet wheel meshing with the sun wheel. Preferably, at least a further second gear wheel 4.2' is provided which is a planet wheel. The fourth gear stage GS4, configured as a planetary gear mechanism, furthermore comprises the ring gear 64, described above in relation to FIGS. 1 to 4, which forms a third gear wheel 4.3 of the planetary gear mechanism PG and is for example molded onto the support structure 60'. The ring gear 64 via its inner toothing 63 meshes with the at least one second gear wheel 4.2 or 4.2'.

With respect to the first gear stage GS1, the first gear wheel 1.1 is rotationally fixedly connected to the gear input shaft 1, and the second gear wheel 1.2 is rotatably mounted on a first axle element 3. With respect to the second gear stage GS2, the first gear wheel 2.1 is also rotatably mounted on the first axle element 3, and the second gear wheel 2.2 is rotatably mounted on a second axle element 4. With respect to the third gear stage GS3, the first gear wheel 3.1 is also rotatably mounted on the second axle element 4, and the second gear wheel 3.2 is rotatably mounted on a third axle element 5. Preferably, the first axle element 3 and/or the second axle element 4 and/or the third axle element 5 are attached or held on the support structure 60' and/or on the housing 12, in particular releasably inserted in push-fit receivers. The support structure 60' may be formed as a platform or at least have a platform-like portion. For example, the support structure 60' is loosely arranged in the housing 12 and/or rests against the housing 12.

To transmit the force flow from the first gear stage GS1 to the second gear stage GS2, preferably the second gear wheel 1.2 of the first gear stage GS1 and the first gear wheel 2.1 of the second gear stage GS2 are connected together rotationally fixedly, or are formed, in particular molded, as a double gear wheel with a common main body 30. To transmit the force flow from the second gear stage GS2 to the third gear stage GS3, for example a single gear wheel is provided in the gear assembly 100, which performs the function of the second gear wheel 2.2 of the second gear stage GS2 and also the function of the first gear wheel 3.1 of the third gear stage GS3. This gear wheel is an intermediate gear and serves for example to stabilize the gear assembly 100 on force transmission. To transmit the force flow from the third gear stage GS3 to the fourth gear stage GS4, preferably the second gear wheel 3.2 of the third gear stage GS3 and the first gear wheel 4.1 of the fourth gear stage GS4 are rotationally fixedly connected together, or are formed, in particular molded, as a double gear wheel with a common main body 30'.

With respect to the fourth gear stage GS4, the at least one second gear wheel 4.2 or 4.2' is rotatably mounted on an associated fourth axle element 6 or 6'. Preferably, the at least one fourth axle element 6 or 6' is attached or held on a planet carrier 4.4 of the fourth gear stage GS4, in particular releasably inserted in a push-fit receiver. To transmit the force flow from the fourth gear stage GS4 to the gear output shaft 2 or the gear wheel 14, the planet carrier 4.4 is rotationally fixedly connected to or molded onto the gear output shaft 2 or the gear wheel 14.

In the present description, the reference to a specific aspect or certain embodiment or particular design means that a specific feature or specific property, which is described in connection with the respective aspect or design or embodiment, is at least contained therein but need not necessarily be contained in all aspects or embodiments or designs of the present disclosure. It is expressly pointed out that every combination of the various features and/or structures and/or properties described in connection with the present disclosure is covered by the present disclosure unless expressly refuted or clearly excluded by the context.

The use of individual or all examples or an exemplary expression in the text serves merely to clarify the present disclosure, and does not constitute a restriction in relation to the scope of the present disclosure unless maintained otherwise. No expression or formulation of the description should be understood to mean that it concerns an element which is not claimed but which is essential for the practice of the present disclosure.

The invention claimed is:

1. A support structure for at least one gear wheel of a geared motor of an electrically operable brake, the support structure comprising a main body, a base part, and a ring gear having an inner toothing, wherein the main body has at least one axle element for rotatably mounting the at least one gear wheel, or at least one connection point for an axle element for rotatably mounting the at least one gear wheel, wherein the ring gear is mounted on the base part and is designed to be used as an outer gear wheel of a planetary gear mechanism, and wherein the inner toothing of the ring gear has a plurality of tooth elements which each extend from a tooth foot to a tooth head in the radial direction relative to a central axis of the ring gear, and an intermediate space formed by a notch is provided between the inner toothing and the base part and exposes a region of the tooth head of at least individual or some tooth elements, wherein the intermediate space is provided in an axial direction between the inner toothing and the base part.

2. The support structure as claimed in claim 1, wherein the intermediate space ends in the region of the tooth foot of each of the plurality of tooth elements.

3. The support structure as claimed in claim 1, wherein starting from the tooth head and viewed in the radial direction relative to the central axis of the ring gear, the intermediate space ends before the tooth foot.

4. The support structure as claimed in claim 1, wherein starting from the tooth head and viewed in the radial direction relative to the central axis of the ring gear, the intermediate space ends at or in the tooth foot.

5. The support structure as claimed in claim 1, wherein starting from the tooth head and viewed in the radial direction relative to the central axis of the ring gear, the intermediate space ends after the tooth foot.

6. The support structure as claimed in claim 5, wherein the intermediate space is circumferential.

7. The support structure as claimed in claim 1, wherein the ring gear is molded onto the base part and the base part is molded onto the main body.

8. The support structure as claimed in claim 7, wherein the support structure is a plastic part and consists of plastic or comprises plastic.

9. The support structure as claimed in claim 8, wherein the base part has a passage opening and, in the radial direction relative to the central axis of the ring gear, an edge portion of the passage opening protrudes inwardly over the inner toothing.

10. The support structure as claimed in claim 9, wherein the base part has a circumferential depression which is configured for rotatable mounting of a planet carrier of the planetary gear mechanism.

11. A gear assembly for a geared motor of an electrically operable brake, wherein the gear assembly can be actively connected on the input side to a drive machine and on the output side to an operating element of the electrically operable brake, and comprises a planetary gear mechanism, at least one spur gear stage and a support structure as claimed in any of the preceding claims, wherein the ring gear of the support structure forms an outer gear wheel of the planetary gear mechanism, and at least one axle element is provided on the main body of the support structure, on which element a gear wheel of the at least one spur gear stage is rotatably mounted.

12. The support structure as claimed in claim 1, wherein the exposed region of the tooth head of at least individual or some tooth elements confronts the base part through the intermediate space.

\* \* \* \* \*